Figure 1:
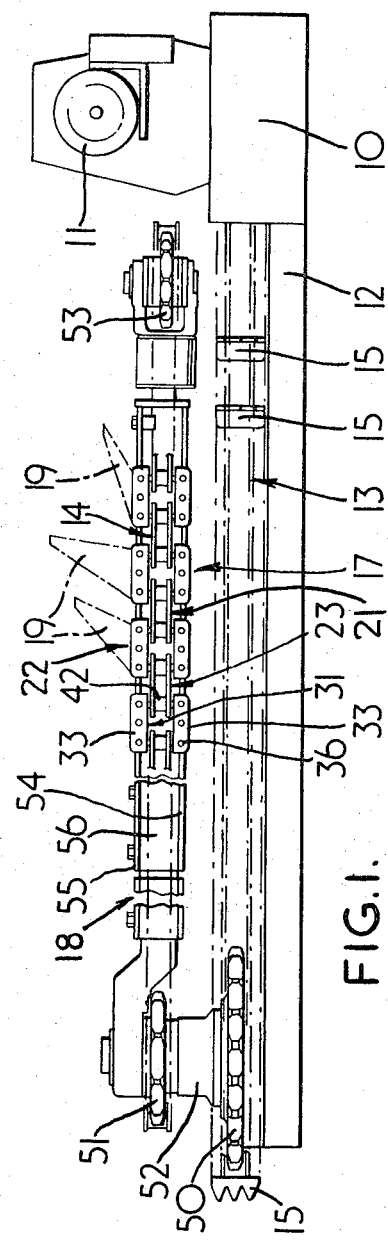

United States Patent [19]
Cheale

[11] 3,757,595
[45] Sept. 11, 1973

[54] CHAIN LINKS
[75] Inventor: Daniel Cheale, Brentwood, England
[73] Assignee: Howard Harvestore Limited, Edmunds, Suffolk, England
[22] Filed: Nov. 19, 1971
[30] Foreign Application Priority Data
    Nov. 26, 1970   Great Britain.................56454/70
    July 24, 1971   Great Britain.................34847/71
[21] Appl. No.: 200,412

[52] U.S. Cl. .............................. 74/245 C, 74/251 C
[51] Int. Cl. ............................................. F16g 13/02
[58] Field of Search ...................... 74/245 C, 245 R, 74/251 C, 251 R, 248, 249, 255 R

[56] References Cited
UNITED STATES PATENTS
3,360,095   12/1967   Harding .................... 74/245 R X Primary Examiner—Leonard H. Gerin
Attorney—Hofgren, Wegner, Allen, Stellman & McCord

[57] ABSTRACT

A chain is made up of interconnected links, each link having side members interconnected by pins or bushes. In forming the links the pins and bushes are initially cylindrical and splines are cut in the ends of the pins and bushes so that the outer diameter of the splines has the same diameter as the remainder of the pins and bushes. The splined portions are then forced into bores in the side members so that the side members are secured rigidly together.

7 Claims, 7 Drawing Figures

CHAIN LINKS

This invention relates to chain formed of interconnected links and to a method of making the links and the chain.

Some forms of chain formed of interconnected links are employed in circumstances which require that the chain is able to resist torsional deflection caused by forces tending to twist the chain when in use. Previous proposals have attempted to meet this requirement in several ways. In one prior proposal the chain is guided in guide means which is arranged to support the chain to prevent torsional deflection. Other prior proposals have attempted to tension the chain sufficiently to prevent torsional deflection. However such proposals have suffered from disadvantages, for example, excessive cost due to the need to provide guide means or the need to provide links which are especially strong in tension. Such prior proposals have not always resulted in chains which resist torsional deflection sufficiently well and which remain efficient after considerable use. In this latter respect it has been found that the links of the chains wear and become progressively less able to resist torsional deflection.

An object of the invention is to provide chain links which are better able to resist torsional deflection even after considerable use.

A further object of the invention is to provide chain and chain links which are more easily manufactured than hitherto.

According to a first aspect the invention provides a method of making chain links comprising side members and pins or bushes for joining the side members, wherein the pins or bushes are formed with a cylindrical outer surface generally of constant diameter, axially extending sets of splines are cut in the ends of the outer surface so that the outer diameter of the splines remains at substantially the same diameter as the original surface of the pins or bushes, and the splined ends are forced into bores formed in the side members to form corresponding sets of splines in the walls of the bores so that the sets of splines inter-engage to secure the pins or bushes to the side members.

The sets of splines may be cut in the pins or bushes by a rotatable cutting wheel having a plurality of helically arranged cutting teeth in its outer periphery.

Conveniently the root diameter of the splines in the pins or bushes is formed so as to be approximately equal to the initial diameter of the bores in the side plates.

By the method of the invention the pins or bushes are easily made without extra machining operations on the ends of the pins or bushes prior to forming the splines, for example, to give portions of reduced diameter in which the splines are formed. Moreover the finished pin or bush when in use in a chain does not have an inherent weakness at the junction of the splined and unsplined portions such as may arise when the ends of the pin or bush are reduced in diameter prior to splines forming to allow for an increase in diameter when roller spline knurling is used to form the splines.

According to a second aspect of the invention a chain comprises chain links each including side members, and pins and bushes interconnecting the side members, the pins and bushes each having sets of axially extending splines formed in their outer surface which engage in correspondingly splined bores in the side members, the outer surface of the splines in the pins and bushes having the same diameter as the outer surface of the remainder of the pins and bushes.

Preferably the chain comprises alternate inner links and outer links, the inner links having side plates interconnected by bushes and the outer links having side plates interconnected by pins, adjacent links being connected to one another by the pins passing through the bushes.

The side members of the outer links may also be interconnected by joining members extending transversely to the side members. This arrangement gives added rigidity to the outer links.

The side members of the outer links may have integral portions extending transversely of the longitudinal direction of the chain and the portions are secured to the joining members. Alternatively the joining members may be integral with the side members. Conveniently cutting or conveying members are secured to the joining members.

Since the fit of the pin or bush in its associated bore allows no relative movement between the pin or bush and the longitudinal members, there is very little torsional deflection if a link is subjected to twisting forces. Moreover wear does not take place during use between the pin or bush and the longitudinal members and the links are able to resist torsional deflection for relatively long periods of use.

Figure 2:
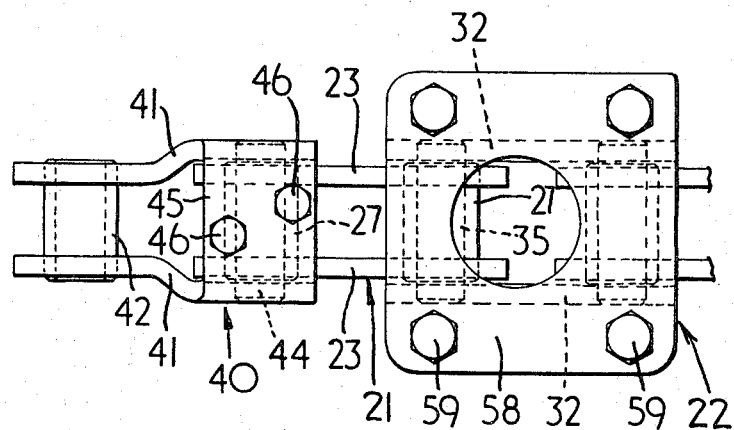
Figure 3:
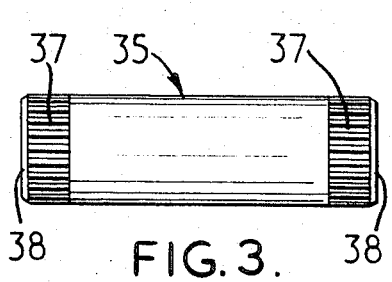
Figure 4:
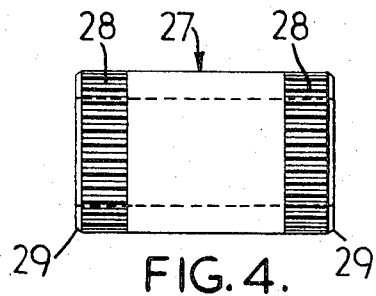
Figure 5:
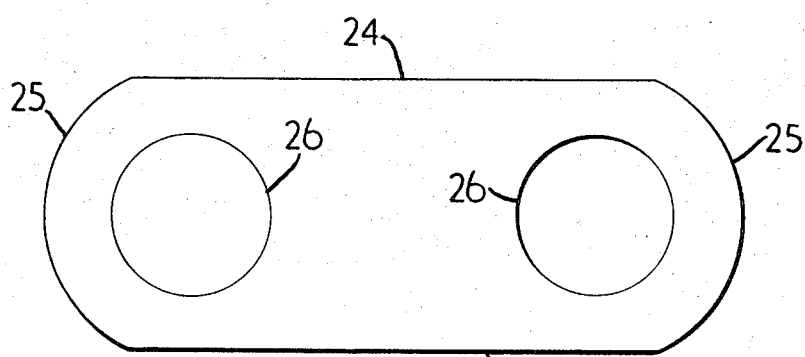
Figure 6:
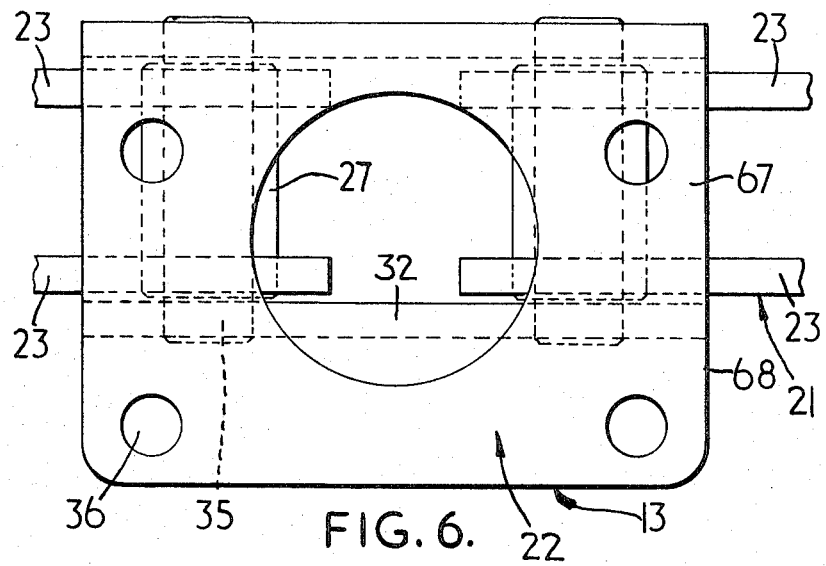
Figure 7:
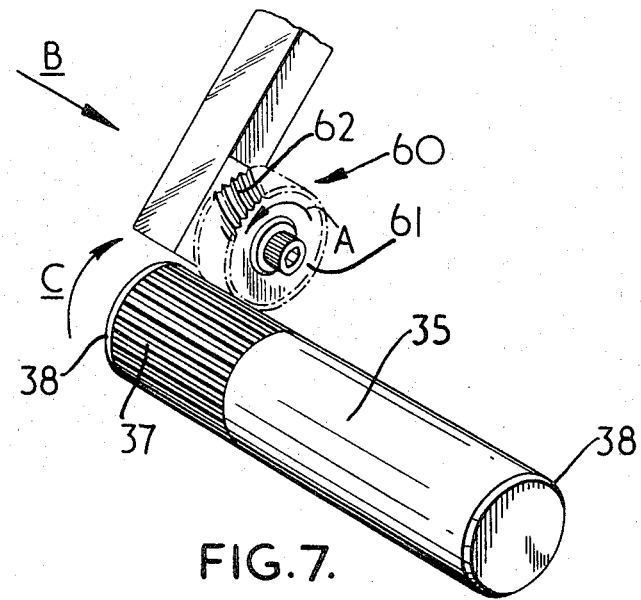

Further features of the invention appear from the following description of an embodiment of the invention given by way of example and with reference to the accompanying drawings in which:

FIG. 1 is a side elevation of an unloader for use in silos for storing crops,

FIG. 2 is a side elevation of a portion of cutter chain for use on the unloader of FIG. 1, FIG. 3 is a pin for use in the cutter chain, FIG. 4 is a bush for use in the cutter chain, FIG. 5 is a side elevation of a longitudinal side member for the inner links of the cutter chain, FIG. 6 is a plan view of interconnected conveyor chain links, and FIG. 7 is a perspective view of a cutting tool forming splines in a pin.

Referring to the drawings and firstly to FIG. 1, an unloader for use in silos includes a frame 10 on which is mounted a motor 11. A box-section frame 12 extends from the frame 10 and carries an endless chain conveyor 13. A cutter unit 14 is carried on the frame 12 and is pivotable about its connection to the frame.

In use the conveyor 13 and cutter unit 14 are inserted into the base of a circular-section silo (not shown) in which crops, for example, compressed and processed, partially fermented green feed crops, are stored. The silo has a trough formed in the concrete base of the silo and the conveyor 13 is located in the trough with the frame 10 and motor 11 located on the outside of the silo.

The chain conveyor 13 carries a series of paddles 15 equally spaced along the chain and the chain passes around a sprocket (not shown) located in the frame 10. At the inner end of the frame 12 the chain conveyor 13 passes around a driven sprocket 50.

A drive sprocket 51 for a cutter chain 17 is carried on a post 52 of the cutter unit 14 and is driven from the driven sprocket 50 for the conveyor chain 13. A drive shaft (not shown) passes from the drive motor 11 through the frame 12 to a bevel gearbox (not shown) located at the inner end of the frame 12 and the cutter unit 14 is pivoted about the axis of the drive sprocket of the cutter chain 17 so that the cutter chain is able to sweep through 360° over the floor of the silo by independent operation of the drive shaft and bevel gearing.

The cutter chain 17 is carried on a box-section frame 18 supported in cantilever from the post 52 and the chain 17 passes around an idler sprocket 53 located at the outer end of the frame 18. The cutter chain 17 has a plurality of cutters 19 secured to the chain in pairs and extending transversely to the chain at various angles between a vertically upwardly extending and horizontally extending direction. The support frame 18 is formed with upper and lower plates 54 and 55 which, with the frame 18, define between them a channel 56 in which the cutter chain is guided for movement around the frame 18.

It will be appreciated that the chain 17 and associated cutters 19 serve to cut into the crop stored in the silo and release the crop for the conveyor 13 to carry the crop out of the silo. If excessive torsional deflection of the chain 17 takes place due to the twisting forces imparted by the action of the cutters 19 on the crop, the cutters will move away from the material they are intended to cut.

Referring now particularly to FIGS. 2 to 5 chain links for use in the cutter chain of the unloader of FIG. 1 are shown.

The chain consists basically of inner links 21 and outer links 22. The inner links 21 comprise two parallel spaced-apart longitudinal members or side plates 23 (see FIG. 5) each side plate being formed with two parallel edges 24 and with part-circular ends 25 and each plate having two bores 26.

The side plates 23 are formed from 1 percent chromium steel which is hardened and tempered to 70 tons/square inch and has a material specification of EN18 conforming with British Standard 970–1955 or some other similar specification.

The side plates 23 are connected together by bushes 27 (FIG. 5) each of which has one end located in a bore 26 in one side plate 23 and the other end located in a bore 26 in another side plate 23.

Prior to assembly, the ends of the bushes 27 are formed with splines 28 (as seen in FIG. 4) which extend parallel to the axis of the bush, and the outer diameter of the splines is equal to the diameter of the outer surface of the central portion of the bush. The extreme ends of the bush are formed with a chamfer 29 inclined at an angle of 70° to the end face of the bush. The splines 28 are conveniently formed by a cutter knurling tool so that there is no need for a shoulder to be formed between the central portion of the bush and the portion where the splines are to be formed. Further details of the manner of forming the splines are given below with reference to FIG. 7.

The bushes 27 are assembled with the side plates 23 by forcing the splined ends of the bushes into the bores 26 so that the splined portions push out their own profile in the side plates. In order to achieve this the bores 26 initially are formed with a plane cylindrical surface and the bore diameter is approximately equal to the root diameter of the splines 28.

The bushes are formed from 3 percent nickel steel and have a material specification of EN36 conforming with British Standard 970–1955 or some other similar specification.

The outer links 22 each comprise two longitudinal members or side plates 31 which are parallel and spaced apart a greater distance than the side plates 23 of the links 21. Each side plate 31 includes a portion 32 parallel to the side plates 23 and a laterally extending portion 33 which is in alignment with the portion 33 of the other side plate 31 of the pair.

The portion 32 has two bores 34 for receiving the ends of pins 35 which interconnect the side plates 31. The portion 33 also has two bores 36 by which plates 58 (to which the cutter tools 19 are secured) are secured to the links 22 by bolts 59.

The pins 35 (see particularly FIG. 3) are formed with splined portions 37 and chamfers 38 in a similar manner to the bushes 27, and the splined portions 37 of the pins 35 are forced into the bores 34 in the side plates 31, as described with respect to the links 21. The pins 35 are case hardened to a thickness of twentyfive thousandths of an inch.

The links 21 and 22 alternate throughout the length of the endless chain and the links 21 are connected to the links 22 by location of each of the pins 35 through a bush 27, the end of each link 21 being located between the side plates 31 of the links 22.

The chain also includes a joint link 40 by which the ends of the chain are connected together to make it endless and by which the chain can be reduced or increased by an amount equal to half the pitch of the chain. The joint link 40 is, in effect, in part an outer link and in part an inner link and includes cranked longitudinal side plates 41 having bores in with are located the splined ends of a bush 42 in the same manner as described in relation to the links 21. The link 40 includes further bores for receiving the splined ends of a joint pin 44 which interconnects the side plates 41. The link 40 further includes integral inwardly and laterally extending members 45 which overlap and which are secured together by bolts 46. Alternatively an outer link can be used as a joint link.

The joint link 40 can be readily released from the cutter chain by removing the pin 44 using a pin withdrawal tool (not shown) by which a withdrawal force is exerted in a direction along the axis of the pin. The link 40 is connected through the pin 44 to a link 21 by location of the pin 44 through a bush 27.

Referring now particularly to FIG. 8 the pins 35 and bushes 27 are made from cylindrical rod and tube respectively having a constant dimaeter along their lengths and the axial splines are formed in the ends of the pins and bushes by a cutting tool 60 in the form of a driven wheel 61 having helical cutting teeth 62. The wheel 61 is rotated in the direction of the arrow A as it is moved axially of the pin 35 as indicated by arrow B, and the pin is rotated about its axis as indicated by the arrow C. In this way the splines 37 are formed with an outer diameter equal to the diameter of the remainder of the cylindrical outer surface of the pin. It will be seen that in the opposite end of the pin 35, yet to be cut with splines 37, a chamfer has already been formed but the chamfer may be formed after the splines have been cut. The splines are cut directly in ends of the pins or bushes without reducing the diameter of the ends prior to cutting the splines, and the outer diameter of the finished splines produced by the cutting operation is the same as the initial diameter of the pins or bushes. In this way the operation of forming the pins or bushes employs the minimum number of steps and in the finished links enhanced strength is achieved.

The invention finds particular application in making a chain which requires resistance to torsional deflection. However the chain is also useful in other applications in which this property is not so important, for example, in the conveyor chain 13 to be used in conjunction with the cutter chain. Such a conveyor chain is now described with reference to FIG. 6. The conveyor chain 13 is basically of the same construction as the cutter chain 14 and the same reference numbers are used for similar parts, the main difference being that the outer links 22 are formed with transversely directed portions 67 and 68 of the side plates 23 extending in the same direction, the portion 67 overlying the other portion 68 and being connected thereto by bolts (not shown). The portions 67 are wider than the portions 68 and the portions 67 support paddles 15 (FIG. 1) which extend in planes at right angles to the direction of movement of the chain.

Each kind of link described has considerable resistance to torsional deflection and the strength of the splined joint between the pin or bush and the side plate is high. In tests when torsion is applied to the joint it has been found that the pin fractures before the splined joint slips. In torsional fatigue tests of a whole link it has been found that for a given applied torque the angular deflection remains constant until fatigue fracture of one of the link components takes place whereas in joints utilising plain pins which are an interference fit in plain bores angular deflection increases until the joint becomes too slack to test.

The use of the chain and chain links is not limited to the particular application described or even to applications in which resistance to torsional deflection is required since the links are relatively cheap to make. This is partly because the fit between the splined ends and the bores allows a larger tolerance in the diameters of the bores and splines than would otherwise be possible, and no rivetting of the pins or bushes is required.

The manner of forming the splined ends of the pins and bushes means that there is no stress concentration at the transition between the splines and the remainder of the pin or bush, and the pins can withstand relatively high stresses over relatively long periods.

The invention provides chain links which can be fabricated to give high resistance to torsional deflection at relatively low costs of manufacture.

What we claim as our invention and desire to secure by Letters Patent of the United States is:

1. A chain comprising chain links each including side members, and cylindrical members interconnecting the side members, the cylindrical members each having sets of axially extending splines formed in their outer surface which engage in correspondingly splined bores in the side members, the outer surface of the splines in the cylindrical members having the same diameter as the outer surface of the remainder of the cylindrical members.

2. A chain according to claim 1 comprising alternate inner links and outer links, the inner links having side plates interconnected by bushes constituting cylindrical members and the outer links having side plates interconnected by pins constituting cylindrical members, adjacent links being connected to one another by the pins passing through the bushes.

3. A chain according to claim 1 comprising alternate inner links and outer links wherein the side members of the outer links are interconnected by joining members extending transversely to the side members.

4. A chain according to claim 3 wherein the side members of the outer links have integral portions extending transversely of the longitudinal direction of the chain and the portions are secured to the joining members.

5. A chain according to claim 3 wherein laterally projecting working members are secured to the joining members.

6. A chain according to claim 1 wherein the side members of each link lie parallel to one another and to the longitudinal direction of the chain.

7. A chain according to claim 1 comprising a joining link having cranked side members interconnected by a cylindrical pin at one end and by a cylindrical bush at the opposite end.

* * * * *